United States Patent [19]
Pyzik

[11] Patent Number: 5,269,989
[45] Date of Patent: Dec. 14, 1993

[54] CERMET OR CERAMIC/GLASS COMPOSITES INCLUDING SELF-REINFORCED β-SILICON NITRIDE, AND METHOD OF MAKING SAME

[75] Inventor: Aleksander J. Pyzik, Midland, Mich.

[73] Assignee: The Dow Chemical Company, Midland, Mich.

[21] Appl. No.: 938,633

[22] Filed: Sep. 1, 1992

[51] Int. Cl.$^5$ .............................................. C04E 35/58
[52] U.S. Cl. ........................................ 264/60; 501/97; 419/13; 419/27; 164/103; 164/105
[58] Field of Search ................ 501/97, 32; 419/13, 419/27; 75/229, 244; 264/43, 60, 66; 164/91, 98, 103, 105

[56] References Cited

U.S. PATENT DOCUMENTS

| | | |
|---|---|---|
| 2,671,955 | 3/1954 | Grubel et al. . |
| 3,969,553 | 7/1976 | Kondo et al. . |
| 4,017,319 | 4/1977 | Greskovich et al. . |
| 4,055,451 | 10/1977 | Cockbain et al. . |
| 4,072,532 | 2/1978 | Fletcher et al. . |
| 4,119,689 | 10/1978 | Prochazka et al. . |
| 4,131,459 | 12/1978 | Phillips . |
| 4,636,480 | 1/1987 | Hillig . |
| 4,650,592 | 3/1978 | Dobbs et al. . |
| 4,657,876 | 4/1987 | Hillig . |
| 4,661,461 | 4/1987 | Brun et al. . |
| 4,689,189 | 8/1987 | Brun et al. . |
| 4,711,860 | 12/1987 | Gadkaree et al. . |
| 4,730,432 | 10/1988 | Minford et al. . |
| 4,756,754 | 7/1988 | SinghDeo . |
| 4,764,195 | 8/1988 | Allaire et al. . |
| 4,883,776 | 11/1989 | Pyzik et al. . |
| 4,891,345 | 1/1990 | Nadkarni et al. . |
| 4,919,689 | 4/1990 | Pyzik et al. . |
| 4,988,645 | 1/1991 | Holt et al. .................. 501/97 X |
| 5,021,372 | 6/1991 | Pyzik et al. . |
| 5,091,347 | 2/1992 | Pyzik et al. . |
| 5,098,449 | 3/1992 | Hwang et al. . |
| 5,118,645 | 6/1992 | Pyzik et al. . |
| 5,120,328 | 6/1992 | Pyzik et al. . |
| 5,160,508 | 11/1992 | Pyzik et al. . |

FOREIGN PATENT DOCUMENTS

| | | |
|---|---|---|
| 0340957 | 11/1989 | European Pat. Off. . |
| 58-101643 | 6/1983 | Japan . |
| 59-58448 | 3/1984 | Japan . |
| 61-249354 | 10/1986 | Japan . |
| 61-274097 | 11/1986 | Japan . |
| 1-263233 | 10/1989 | Japan . |

*Primary Examiner*—Karl Group
*Attorney, Agent, or Firm*—D. R. Howard

[57] ABSTRACT

Infiltrate a porous, self-reinforced β-Si$_3$N$_4$ preform with a metal or a crystallizable glass to yield a composite material. The preform possesses a low glass phase and has a density of from about 50 to about 70 percent of theoretical density. Prepare the β-Si$_3$N$_4$ preform by subjecting a porous body formed from an α-Si$_3$N$_4$ powder composition to two sequential heat treatments. The first heat treatment occurs below the α- to β- conversion temperature and results in a strengthened body that can be machined. The second heat treatment occurs above that temperature and yields the self-reinforced β-Si$_3$N$_4$ preform. Conventional infiltration procedures with an infiltrant that is a metal or a glass results in a Si$_3$N$_4$/metal or Si$_3$N$_4$/glass composite material that has 50 to 70 percent of its volume occupied by β-Si$_3$N$_4$ whiskers.

12 Claims, No Drawings

CERMET OR CERAMIC/GLASS COMPOSITES INCLUDING SELF-REINFORCED β-SILICON NITRIDE, AND METHOD OF MAKING SAME

BACKGROUND OF THE INVENTION

1. Field of the Invention

The present invention relates to cermets (ceramic/metal composites) and ceramic/glass composites, and more particularly to cermets and ceramic/glass composites containing silicon nitride as their major ceramic phase.

2. Description of Related Art

Silicon nitride ceramics possess a number of physical properties that make them useful in a variety of tribological and high temperature applications. These properties include good wear resistance, low coefficient of thermal expansion, good thermal shock resistance, high creep resistance, high electrical resistivity, resistance to chemical attack, and convenient fabrication into near-net shapes. Two of the many uses of silicon nitride ceramics are as cutting tools, and as parts for pumps and engines.

Unfortunately, silicon nitride ceramics have certain shortcomings. They are often brittle. They also have a fracture toughness and strength lower than might be desired for various applications. This may be due to structural flaws introduced by conventional manufacturing techniques.

Numerous, less than completely successful, approaches to overcome the shortcomings are known. One approach pressure infiltrates a porous (rather than densified), particulate silicon nitride preform with another material, such as a metal or glass. This approach typically requires long process times in exchange for less than desirable improvements in physical properties. A second approach involves forming a preform from silicon nitride whiskers rather than silicon nitride powder. This approach yields preforms that are only 30 to 40 percent dense. In other words, the whiskers occupy only that volume of the preform. The whiskers, after processing into a preform, typically have low aspect ratios. If mixing times are too short, the preforms tend to have a nonuniform distribution of whiskers and a nonuniform density. In addition, whiskers are susceptible to moving with respect to each other during infiltration. This approach also usually mandates use of special equipment and observance of procedures for handling small whiskers during preform preparation. In addition, silicon nitride whiskers are expensive. A third approach employs chopped silicon nitride fibers instead of the much finer whiskers. This approach fails to substantially lower cost and introduces further limitations such as lack of isotropic uniformity and low reinforcing material content. In addition, polycrystalline fibers do not have the same high strength characteristics as whiskers.

SUMMARY OF THE INVENTION

One aspect of the present invention is a process for making a silicon nitride/metal or silicon nitride/glass composite, comprising the steps of: (a) heating a porous, friable, α-silicon nitride preform to a temperature and for a time sufficient to convert the preform to a porous structure that can be machined or drilled without crumbling; (b) heating the porous structure to a temperature sufficient to convert substantially all of the α-silicon nitride to β-silicon nitride thereby resulting in a porous, self-reinforced, β-silicon nitride preform; and (c) infiltrating said β-silicon nitride preform with a metal or a glass.

A second aspect of the present invention is a silicon nitride composite material comprising from about 50 to about 70 volume percent randomly oriented β-silicon nitride whiskers and from about 50 to about 30 volume percent of a continuous phase material that is a metal or a crystallizable glass, all volume percentages being based upon composite volume.

DETAILED DESCRIPTION OF THE PREFERRED EMBODIMENTS

The starting material used to make the silicon nitride preform employed in the present invention can be any silicon nitride ($Si_3N_4$) powder that has an α-$Si_3N_4$ content in excess of 50 weight percent (wt-%), based upon powder weight. The $Si_3N_4$ powder may also contain β-$Si_3N_4$, amorphous $Si_3N_4$, or mixtures thereof. The starting $Si_3N_4$ desirably has a high α-phase to β-phase weight ratio. The starting $Si_3N_4$ preferably contains greater than about 80 wt-% of equiaxed, crystalline α-$Si_3N_4$ and less than about 20 wt-% β-$Si_3N_4$. The respective α- and β-$Si_3N_4$ contents are more preferably greater than 90 wt-% and less than 10 wt-%, most preferably greater than 94 wt-% and less than 6 wt-%.

The starting $Si_3N_4$ is desirably as pure as possible. High purity is believed to optimize physical properties of the resultant composite. Some impurities may, however, be tolerated. Oxygen, in the form of silica ($SiO_2$), is a typical impurity. The oxygen content is preferably no greater than about 2.0 wt-%, based upon powder weight. Oxygen contents in excess of 2.0 wt-% may lead to formation of an undesirable glassy phase in the preform.

Silicon nitride powders sometimes contain nonmetals as impurities. Small amounts, up to about 0.5 wt-% based upon powder weight, are not deleterious and can be tolerated. Carbon is one such nonmetal that is typically present. The amount of carbon should be minimized as much as possible because it may form silicon carbide (SiC), an undesirable contaminant for the $Si_3N_4$ composite.

Typical $Si_3N_4$ starting materials may also be contaminated with metals, such as iron or aluminum. The metals may react to form low-melting intergranular phases. The low-melting phases are undesirable because they tend to lower the high temperature properties of the resultant composite. Lower high temperature properties are particularly possible if the infiltrant is glass. Metal contaminants are present in a total amount, based upon $Si_3N_4$ powder weight, that preferably does not exceed about 0.5 wt-%, and more preferably about 0.1 wt-%. Iron is particularly undesirable because it forms a brittle iron silicide that can reduce the strength of the resulting composite. The $Si_3N_4$ starting powder preferably contains less than about 1000 parts per million (ppm) iron, more preferably less than about 250 ppm iron.

The $Si_3N_4$ powder can be of any size or surface area provided it can be converted to a porous, self-reinforced, β-$Si_3N_4$ preform in accordance with the present invention. The conversion is promoted by using appropriate additives, such as the various oxides described herein. Large particles Of $Si_3N_4$, those having an average diameter within a range of from about 15 micrometers ($\mu$m) to about 50 $\mu$m, may be in the form of hard agglomerates that cannot easily be broken. Powders containing such agglomerates yield poor preforms and composites. On the other hand, very fine powders, those having an average diameter less than about 0.2 $\mu$m, are often difficult to process and typically possess poor uniformity. Accordingly, the $Si_3N_4$ powder has an average diameter that is preferably within a range of from about 0.2 to about 10.0 $\mu$m, more preferably from about 0.5 to about 3.0 $\mu$m.

The $Si_3N_4$ starting material must yield a porous, self-reinforced $\beta$-$Si_3N_4$ preform. A preferred way to do so includes adding certain metal and nonmetal oxides to the starting $Si_3N_4$ powder. The oxides are present in a total amount that is preferably less than about 10 wt-%, more preferably less than about 5 wt-%, and most preferably less than about 3 wt-%, based upon total starting material weight. One combination of oxides found particularly useful in the practice of the present invention includes yttrium oxide ($Y_2O_3$), magnesium oxide (MgO), silica ($SiO_2$), zirconium oxide ($ZrO_2$) and tantalum oxide ($Ta_2O_5$).

Magnesium oxide promotes strengthening of porous preforms when they are heated below about 1600° C. It also promotes densification, in the absence of applied pressure, of individual $Si_3N_4$ particles in the preform during their transformation to elongated $\beta$-$Si_3N_4$ grains when such preforms are heated above 1600° C. Magnesium oxide is used as a densification aid in hot pressing ceramic powders into densified bodies. It forms a liquid phase between about 1300° C. and about 1500° C. into which $\alpha$-$Si_3N_4$ dissolves. The rate of mass transport of the $\alpha$-$Si_3N_4$ into the liquid or glassy phase depends upon MgO content and upon the ratio of MgO to $Y_2O_3$. In same compositions, MgO can be replaced by SrO.

Any amount of MgO or SrO that promotes the formation of a self-reinforced $\beta$-$Si_3N_4$ preform is acceptable. The amount is preferably within a range of from about 0.5 to about 2 wt-%, more preferably about 1 wt-%, and most preferably about 0.86 wt-%. The amount is based upon weight of the $Si_3N_4$ starting material.

Excessive shrinkage during formation of the self-reinforced $\beta$-$Si_3N_4$ preform is undesirable. The shrinkage may be controlled to a degree provided kinetics of grain growth or whisker formation are faster than kinetics of densification. The amount of shrinkage is preferably less than about 10 volume percent, based upon volume of the porous structure that results from heating the porous, friable $\alpha$-$Si_3N_4$ preform. The amount of shrinkage is more preferably less than about 5 volume percent.

Upon heating with $Si_3N_4$, $Y_2O_3$ forms a glassy phase through which mass transport of the $Si_3N_4$ is considerably slower than through MgO. Instead of serving as a densification aid, $Y_2O_3$ promotes rapid and essentially complete conversion of $\alpha$-$Si_3N_4$ powder grains to elongated $\alpha$-$Si_3N_4$ grains. The elongated $\beta$-$Si_3N_4$ grains give the self-reinforced $\beta$-$Si_3N_4$ preform and composites made from it their high fracture toughness and strength.

The amount of $Y_2O_3$ in the starting powder should be sufficient to cause essentially complete conversion of the starting silicon nitride powder to elongated $\beta$-$Si_3N_4$ grains. The amount should also be sufficient to produce the self-reinforced $\beta$-$Si_3N_4$ preform that is formed as part of the process of the present invention. The amount Of $Y_2O_3$ is desirably from about 1 to about 3.5 wt-%, preferably about 2 wt-%, and most preferably about 1.74 wt-%, based upon weight of the $Si_3N_4$ starting material.

The amount of $SiO_2$ is desirably within a range of from about 0.5 to about 3.5 wt-%, based upon weight of the $Si_3N_4$ starting material. The amount is preferably from about 0.8 to about 2.5 wt-%, most preferably from about 1.5 to about 2.0 wt-%. The amount Of $SiO_2$ helps control the size distribution of $\beta$-$Si_3N_4$ grains. In the presence of large amounts of $SiO_2$, small grains are eliminated and the average diameter shifts in favor of larger grain sizes.

Zirconium oxide ($ZrO_2$) is desirably present in an amount within a range of from about 0.1 to about 1.0 wt-%, based upon weight of the $Si_3N_4$ starting material. The amount is preferably from about 0.4 to about 0.7 wt-%. Amounts in excess of 1.0 wt-% are undesirable because they lead to formation of ZrN. Amounts within the foregoing ranges promote, or increase the speed of, $\alpha$-$Si_3N_4$ to $\beta$-$Si_3N_4$ transformation. $ZrO_2$ may, however, be eliminated as the transformation occurs in its absence even though it does so at a slower pace.

The $Si_3N_4$ starting material also desirably includes at least one oxide selected from the group consisting of $Ta_2O_5$, calcium oxide (CaO), lanthanum oxide ($La_2O_3$), gadolinium oxide ($Gd_2O_3$), indium oxide ($In_2O_3$), or titanium dioxide ($TiO_2$). As an alternative to the oxide, the starting material may contain compounds or materials that convert to such oxides during the process of the present invention. If the starting material contains MgO, the group of oxide materials also includes SrO. A total amount of oxide(s) is within a range that is desirably from about 0.1 to about 0.5 wt-%, preferably from about 0.2 to about 0.5 wt-%. The oxide(s) enhance the formation of high aspect ratio whiskers of uniform size.

Relatively small powder particle sizes are favored for the oxide powders, since smaller particle sizes usually enhance particle dispersion. Given the preferred size of $Si_3N_4$ starting particles, the oxide powders desirably have an average diameter of no greater than about 5 $\mu$m. The average diameter is preferably from about 0.5 to about 1.0 $\mu$m.

The metal oxide and nonmetal oxide powders may be admixed with $Si_3N_4$ Powder using any conventional procedure and apparatus. One such apparatus is a ball mill. A preferred procedure uses a ball mill to prepare a finely divided suspension of the powders in a carrier medium. The suspension, after drying, yields a powdered admixture suitable for further processing in accordance with the present invention. Although the powders need not be added to the carrier medium in any particular order, the $Si_3N_4$ powder is preferably added to a colloidal suspension of the oxide powders in the carrier medium. Due care should be taken to avoid simultaneous addition of components that would cause one or more of the components to agglomerate or flocculate.

The carrier medium may be any organic or inorganic compound that does not react with powdered materials used to prepare a porous, self-reinforced, $\beta$-$Si_3N_4$ preform and is a liquid at room temperature (taken as 21° C.) and atmospheric pressure. Suitable carrier media include: water; alcohols, such as methanol, ethanol or isopropanol; ketones, such as acetone or methyl ethyl ketone; aliphatic hydrocarbons, such as pentane or hexane; and aromatic hydrocarbons, such as benzene or toluene. The carrier medium is preferably polar, more preferably is water.

The carrier medium is used in an amount sufficient to impart a viscosity suitable for mixing powdered components of the starting material. The amount preferably yields a solids content of from about 20 to about 40 wt-%, based upon weight of the suspension. A solids content below about 20 wt-% typically results in inadequate deagglomeration of the powdered components and a viscosity that is too low. Conversely, a solids content above about 40 wt-% usually leads to inadequate mixing and an excessively high viscosity.

One or more conventional surfactants or dispersants may be used as aids to prepare the suspension. Selection of satisfactory surfactants and dispersants does not require undue experimentation.

Water soluble bases that serve as surfactants include ammonia, alkali metal hydroxides, alkali metal alkoxides, alkylamines, quaternary ammonium hydroxides and metal silicates. The base is preferably a metal silicate such as sodium silicate.

The surfactant should be used in an amount sufficient to improve the dispersion of solid components in the suspension. If a strong base is used as a surfactant, the amount is desirably sufficient to raise the pH of the aqueous suspension to about 10, and more preferably to about 11.0 to about 11.5. Flocculation may occur with a pH value less than 10.0 or greater than 11.5. The amount is desirably within a range of from about 0.01 to about 1.0 wt-%, based upon powder mixture weight.

After obtaining a generally uniform dispersion of powdered components in the carrier medium using conventional apparatus, the dispersion is desirably passed through a filter or sieve. This effectively removes any remaining agglomerates that are large enough to adversely affect properties of the resultant composite. The sieve or filter preferably has an opening sufficient to remove agglomerates larger than about 100 micrometers in diameter.

The filtered dispersion may be converted into a greenware preform by any of a variety of conventional techniques. The dispersion can, for example, be dried to form a powder that can then be ground for use in cold-pressing procedures. If desired, the powder can be passed through a sieve such as that used for filtering the dispersion before it is cold-pressed into a greenware preform. Conventional apparatus, such as a cold isostatic press having a graphite die and opposing, parallel graphite plates, may be used to prepare the preform. As an alternative, the greenware preform may also be prepared by slip casting. The particular technique is not critical. The greenware, irrespective of how it is formed, desirably has a shape close to that desired for the resultant composite. This minimizes machining operations after the composite is formed.

After the greenware is formed, it is subjected to a heat treatment at a temperature within a range of from about 1400° C. to less than about 1600° C. for a time of from about 30 minutes to about 4 hours. The temperature is preferably from about 1500° to about 1550° C. The temperature must remain below 1600° C. at this stage to substantially preclude the growth of elongated $\beta$-$Si_3N_4$ grains. The time is preferably from about 30 minutes to about 120 minutes, more preferably from about 30 minutes to less than about 60 minutes. The heat treatment causes some shrinkage of the greenware. It also results in a porous structure that can, after it is cooled to ambient temperature, be machined or drilled without crumbling.

After the heat treatment and any desired machining, shaping or drilling procedures, the porous structure is subjected to a high temperature heat treatment. The high temperature heat treatment desirably occurs in a nitrogen atmosphere at a temperature within a range of from 1600° C. to about 1800° C. It may also occur in a gaseous nitrogen atmosphere at a temperature within a range of from 1800° C. to about 2000° C. when a pressure in excess of 100 MPa is applied. The high temperature heat treatment converts the $\alpha$-$Si_3N_4$ to $\beta$-$Si_3N_4$ and yields a porous, self-reinforced, $\beta$-$Si_3N_4$ preform. The high temperature heat treatment temperature and time depend upon the nature of the $Si_3N_4$ powder and the oxides that are added to it. Control of the high temperature heat treatment temperature leads, in turn, to controlling the size of elongated $\beta$-$Si_3N_4$ whiskers. For example, high temperature heat treatment of a preferred composition containing 0.1 wt-% $Ta_2O_5$, 0.83 wt-% $SiO_2$, 0.86 wt-% MgO, 1.74 wt-% $Y_2O_3$ and the balance $Si_3N_4$ preferably occurs in a nitrogen atmosphere at a temperature within a range of from 1600° C. to about 1750° C. The range is more preferably from about 1650° C. to about 1700° C. The temperatures may vary depending upon the apparatus used to measure the high temperature heat treatment. The apparatus preferably includes a tungsten-rhenium thermocouple.

The high temperature heat treatment should continue for a time sufficient to substantially complete the conversion of $\alpha$-$Si_3N_4$ to elongated $\beta$-$Si_3N_4$ whiskers. The time is preferably from about 6 to about 12 hours. The high temperature heat treatment should be carried out under an inert atmosphere, such as nitrogen, in order to prevent oxidation or decomposition of the silicon nitride. The inert atmosphere should be maintained about the resultant preform as it cools after the high temperature heat treatment.

The resulting self-reinforced $\beta$-$Si_3N_4$ preform is typically on the order of about 50 to about 70 percent dense. The density of the preform will depend in part upon the particular method selected for making the greenware preform from the suspension. For example, slip-casting of the suspension will give a preform density that ranges from 35 to 50% of theoretical density. Dry pressing or isostatic pressing a dried powder gives a density that nominally ranges from 50 to 60% of theoretical density.

The resulting preform is essentially composed of a single phase of self-reinforced $\beta$-$Si_3N_4$. It is substantially free of any second glassy phase. For example, when made from the preferred composition disclosed above, the preform contains less than 1 wt-% residual glass. The balance is $Si_3N_4$.

The density of the self-reinforced $\beta$-$Si_3N_4$ preform poses no barrier to infiltration by a metal or a crystallizable glass. In fact, infiltration by any one of a variety of conventional methods used for infiltration of $Si_3N_4$ preforms of a lower density is unexpectedly rapid. Infiltration is preferably carried out by pressure infiltration using pressures and times comparable to those used for infiltration of lower density $Si_3N_4$ preforms.

The metal or glass must be in molten form in order for infiltration to proceed. The metal is selected from the group consisting of copper, aluminum, nickel, iron, titanium, cobalt, and alloys containing at least one of said metals.

The resultant $Si_3N_4$/metal or $Si_3N_4$/glass composites are also part of the present invention. The composites comprise from about 50 to about 70 volume percent randomly oriented $\beta$-$Si_3N_4$ whiskers and from about 50 to about 30 volume percent of a continuous phase material. The volume percentages are based upon total composite volume. The continuous phase material is a metal or a glass. The glass is preferably a crystallized glass. The metal is selected from the group consisting of copper, aluminum, nickel, iron, titanium, cobalt, and alloys containing at least one of said metals. The β-Si$_3$N$_4$ whiskers contain, or have incorporated therein, less than 1 wt-% of a glassy phase.

The following examples serves to illustrate the method of preparing the self-reinforced β-Si$_3$N$_4$ preform, the method of incorporating the preform into a composite, and the resulting composite. The examples do not, however, limit the scope of the invention. All parts and percentages are by weight unless otherwise specified.

EXAMPLE 1

Magnesium oxide (0.86 grams (g)), silica (0.83 g) and tantalum oxide (0.10 g) powders are suspended in 80 milliliters (ml) of water, and agitated at room temperature (about 21° C.) under ambient air by a mechanical stirrer. The powders each contain less than 20 ppm of iron, lead, sodium, boron and zinc. They have particle sizes on the order of 1 μm. Aqueous sodium silicate addition adjusts the suspension pH to about 11.35. Fine agglomerates remaining in the suspension are broken down by the application of ultrasound for 30 seconds. The application of ultrasound causes the suspension pH to drop. It is raised to 11.5 by adding 5 M sodium hydroxide. The suspension is mixed for 30 minutes before adding 1.74 9 Y$_2$O$_3$ (2 to 5 μm average particle size). The Y$_2$O$_3$ has a purity comparable to that of the other oxide powders. The suspension is subjected to ultrasound for 30 seconds and then stirred for an additional 30 minutes to provide an oxide suspension.

Equiaxed a-Si$_3$N$_4$ powder (96.37 g) is added to the oxide suspension. The suspension is then mixed in an attrition mixer for about 30 minutes. The α-Si$_3$N$_4$ powder has an average particle size of about 1 μm and contains 1.23 wt-% oxygen and less than 1000 ppm iron, less than 500 ppm aluminum, and less than 50 ppm titanium.

The resulting suspension is passed through a 100 mesh (150 μm opening) nylon sieve. The suspension pH is adjusted to about 9.8 by adding 50 percent nitric acid. The pH change results in an increase in flocculation of the suspension. The suspension is then dried, under a flow of nitrogen gas, in an oven set at a temperature of 90° C. for 12 hours. The resulting powder is passed through a sieve when cooled, to remove particles greater than 100 μm in diameter.

Greenware preforms are formed from a portion of the sieved powder by cold pressing in a graphite die. The preforms are heated at 1550° C. for 2 hours to improve their mechanical strength and homogenize their glassy phase. The resultant preforms are machined to form porous discs having a diameter of 1 inch (2.54 cm) and a thickness of 0.25 inch (0.64 cm). The discs are subjected to a high temperature heat treatment under a nitrogen atmosphere at 1650° C. for 12 hours and then cooled to ambient temperature. The resulting heat-treated, porous discs are composed almost entirely of self-reinforced β-Si$_3$N$_4$ whiskers with a glass content of <1 wt-%. They have a density of about 62 % of theoretical. The β-Si$_3$N$_4$ whiskers have diameters within a range of 0.3 to 0.7 μm and lengths within a range of 25 to 50 μm.

The discs are then pressure infiltrated with one of molten copper, molten aluminum or molten PYREX ™ brand No. 7740 glass (Corning Glass Works). Each disc is placed in a container and surrounded by the infiltrating material. The container is a stainless steel can for copper and aluminum and a quartz tube for PYREX ™ brand glass. The containers and their contents are then heated to a suitable temperature and subjected to a pressure of 830 MPa for a period of 10 seconds using a mechanical forging press like that used in Rapid Omnidirectional Compaction (ROC). The temperatures for copper, aluminum and PYREX ™ brand glass are, respectively, 1200° C., 800° C. and 1600° C. The containers and their contents are then cooled to ambient temperature and the infiltrated discs are recovered. All discs have densities greater than 98 % of theoretical.

This example demonstrates that one can make a silicon nitride/metal or a silicon nitride/glass composite that has sufficient β-Si$_3$N$_4$ in the form of whiskers to occupy from about 50 to about 70 percent of the volume of said composites. The composites are prepared without any separate procedure that involves handling loose β-Si$_3$N$_4$ whiskers. It also demonstrates that the porous preform can, after the initial heat treatment, be machined-before the conversion of α-Si$_3$N$_4$ to β-Si$_3$N$_4$ begins. This also avoids generation of loose β-Si$_3$N$_4$ whiskers. Similar results are obtained with other infiltrants, Si$_3$N$_4$ compositions and high temperature heat treated preform densities, all of which are disclosed herein.

EXAMPLE 2

Two different compositions are converted to porous, self-reinforced, β-Si$_3$N$_4$ preforms by replicating the procedure of Example 1 save for increasing the high temperature heat treatment temperature from 1650° C. to 1750° C. One composition (Composition A) contains 97% Si$_3$N$_4$, 1.7% Y$_2$O$_3$, 0.7% MgO, 0.4% ZrO$_2$ and 0.2% CaO. It has a green density of 54%, a density after the high temperature heat treatment of 62%, a glass content of <1%, and all Si$_3$N$_4$ is in the form of β-Si$_3$N$_4$ whiskers that have an average diameter of 0.3 μm and lengths within a range of 20 to 30 μm. The second composition (Composition B) contains 98% Si$_3$N$_4$, 1.2% Y$_2$O$_3$, 0.4% SrO, 0.3% ZrO$_2$ and 0.1% TiO$_2$. It has a green density of 49%, a density after the high temperature heat treatment of 53%, a glass content of <1%, and all Si$_3$N$_4$ is in the form of β-Si$_3$N$_4$ whiskers that have an average diameter of 0.3 μm and lengths within a range of 15 to 20 μm. Analysis of the preforms by Analytical Scanning Electron Microscopy (ASEM) and Analytical Transmission Electron Microscopy (ATEM) reveals the absence of surface oxygen.

This example shows that porous preforms can be formed without excessive shrinkage. Similar results are expected with other Si$_3$N$_4$ compositions that are disclosed herein.

EXAMPLE 3

A powder mixture containing 91.5% α-Si$_3$N$_4$, 3.3% SiO$_2$, 2.9% Y$_2$O$_3$, 1.6% MgO, 0.5% ZrO$_2$ and 0.2% Ta$_2$O$_5$ is dry blended for 1 hour in a plastic bottle. This yields a powder blend containing small, spherical agglomerates that have a diameter of 10–25 pm. The powder blend flows easily into a graphite die. The powder is tapped to a density of about 48% of theoretical. The tapped powder is heated to a temperature of 1400° C. for 1 hour to form a preform that can, if desired, be machined in the same manner as the preforms of Example 1. The preform is heated in a graphite crucible at a temperature of 1750° C. for 12 hours and then cooled. All α-Si$_3$N$_4$ is converted to β-Si$_3$N$_4$ and analysis as in Example 2 reveals no surface oxygen. The density is 59% of theoretical.

The preform is placed in a stainless steel can together with copper. The can and its contents are heated, as in Example 1, to a temperature of 1100° C. and then subjected to a pressure of 830 MPa for 10 seconds. The resultant part has a density of 98.9% of theoretical and a hardness of 1120 kg/mm$^2$.

This example shows that dry blending powders also yields satisfactory parts. Similar results are obtained with other infiltrants, Si$_3$N$_4$ compositions and high temperature heat treated preform densities, all of which are disclosed herein.

What is claimed is:

1. A process for making a silicon nitride/metal or silicon nitride/glass composite, comprising the steps of:
   (a) heating a porous, friable, alpha-silicon nitride preform to a temperature and for a time sufficient to convert the preform to a porous structure that can be machined or drilled without crumbling;
   (b) heating the porous structure to a temperature sufficient to convert substantially all of the alpha-silicon nitride to beta-silicon nitride thereby resulting in a porous, self-reinforced, betasilicon nitride preform; and
   (c) infiltrating said beta-silicon nitride preform with a metal or a glass.

2. The process of claim 1 further comprising a step intermediate between step (a) and step (b) wherein the porous structure is subjected to mechanical shaping operations sufficient to impart a desired shape to the structure.

3. The process of claim 2 wherein the desired shape is a near net shape.

4. The process of claim 1 wherein alphasilicon nitride occupies from about 40 to about 65 percent of the volume of the porous, friable, alphasilicon nitride preform.

5. The process of claim 1 wherein the structure, prior to step (b), contains alpha-silicon nitride in an amount sufficient to occupy from about 45 to about 70 percent of the volume of the structure.

6. The process of claim 1 wherein the selfreinforced beta-silicon nitride preform has sufficient beta-silicon nitride to occupy from about 50 to about 70 percent of the volume of said preform.

7. The process of claim 1 wherein the temperature and time in step (a) are, respectively from about 1400° C. to less than about 1600° C. and less than about one hour.

8. The process of claim 1 wherein the temperature in step (b) is from about 1600° C. to about 2000° C.

9. The process of claim 1 wherein the alpha-silicon nitride preform is fabricated from a composition comprising: alpha-silicon nitride; yttrium oxide; silicon dioxide; magnesium oxide; and at least one of tantalum pentoxide, calcium oxide, gadolinium oxide, lanthanum oxide, indium oxide, titanium dioxide and strontium oxide; and, optionally, zirconium oxide.

10. The process of claim 1 wherein the alpha-silicon nitride preform is fabricated from a composition comprising: alpha-silicon nitride; yttrium oxide; silicon dioxide; zirconium oxide; strontium oxide; and at least one of tantalum pentoxide, calcium oxide, gadolinium oxide, lanthanum oxide, indium oxide and titanium dioxide.

11. The process of claim 1 wherein the metal is copper, aluminum, nickel, iron, titanium, cobalt, or an alloy containing at least one of them.

12. The process of claim 1 wherein the beta-silicon nitride is in the form of whiskers having a diameter within a range of from about 0.3 μm to about 0.7 μm and a length within a range of from about 25 μm to about 50 μm.

* * * * *